United States Patent [19]

Disser

[11] Patent Number: 4,673,851
[45] Date of Patent: Jun. 16, 1987

[54] PWM MOTOR OPERATING SYSTEM WITH RFI SUPPRESSION

[75] Inventor: Robert J. Disser, Dayton, Ohio

[73] Assignee: General Motors Corporation, Detroit, Mich.

[21] Appl. No.: 845,909

[22] Filed: Mar. 31, 1986

[51] Int. Cl.[4] .......................... G05B 11/28; H02J 1/02
[52] U.S. Cl. ................................... 318/341; 318/629; 318/599; 318/345 R; 363/41; 363/124
[58] Field of Search ............... 307/10 R, 104, 105, 307/542, 327, 234, 236, 497, 501; 318/599, 629, 635, 129, 130, 132, 133, 138, 310-318, 324-335, 345 B, 345 R, 356, 357, 341, 601-611; 361/110-112; 363/41, 42, 26, 39, 46, 45, 47, 20, 21, 124

[56] References Cited

U.S. PATENT DOCUMENTS

| | | | |
|---|---|---|---|
| 3,408,551 | 10/1968 | Kuba | 363/40 X |
| 3,522,519 | 8/1970 | Petersen | 363/124 |
| 3,567,966 | 3/1971 | Somers | 307/236 X |
| 3,982,174 | 9/1976 | Maddox | 323/17 |
| 4,037,271 | 7/1977 | Keller | 363/21 |
| 4,163,264 | 7/1979 | Ishii | 363/39 X |
| 4,245,288 | 1/1981 | McLyman | 363/40 |
| 4,363,067 | 12/1982 | Radomski | 363/20 X |
| 4,371,917 | 2/1983 | Bator | 363/21 |
| 4,412,279 | 10/1983 | Franklin | 363/128 |
| 4,482,848 | 11/1984 | Heal et al. | 363/124 X |
| 4,504,897 | 3/1985 | Blackwood | 363/39 |
| 4,599,548 | 7/1986 | Schultz | 318/599 |
| 4,607,319 | 8/1986 | Assow et al. | 363/20 |
| 4,625,270 | 11/1986 | Taylor | 363/39 |

Primary Examiner—William M. Shoop, Jr.
Assistant Examiner—Shik Luen Paul Ip
Attorney, Agent, or Firm—Robert M. Sigler

[57] ABSTRACT

A pulse width modulated DC motor operating system is disclosed which reduces the communication back to the power supply of transient spikes caused by the switching characteristics of the freewheeling diode. The switched current path comprises, in series, a DC power supply, a low pass filter including charge storage means, a DC motor armature, a FET and a resistor. A freewheeling diode is connected across the motor armature. PWM signal generating apparatus switches the FET to control average motor armature current. A capacitor is connected across the FET and diode with minimal lead length to reduce stray inductance. The capacitor is effective to communicate voltage shifts across the resistor with FET switching to the cathode of the diode and thus serve as a source of supplemental current flow through the diode during diode switching partially in preference to the charge storage means of the low pass filter, whereby the diode switching voltage spikes communicated through the low pass filter to the DC power supply are reduced in amplitude and frequency and RFI is reduced. The resistor, along with another low pass filter, also provides an average motor armature current signal for current limiting apparatus and thus serves a dual function in the circuit.

2 Claims, 2 Drawing Figures

PWM MOTOR OPERATING SYSTEM WITH RFI SUPPRESSION

BACKGROUND OF THE INVENTION

This invention relates to a PWM or pulse width modulated DC motor operating system of the type in which an electronic chopper control generates a pulse signal of predetermined frequency and duty cycle to control a solid state switch in the motor armature circuit and thus control the average armature current. It further relates to such a system in which a freewheeling diode is connected across the motor armature terminals.

Such systems are known to generate high frequency transients as the electronic switch turns on and off. This is due to the characteristics of the freewheeling diode, which is switched back and forth between its forward conducting state and its reverse biased state. During each of these transitions the diode becomes a momentary short circuit and causes a significant current and voltage spike of very short duration. These spikes are transients rich in higher harmonics in the radio frequency range, which are communicated back into the power supply and radiated from the connecting wires. On a motor vehicle, where the motor operating system might be used in under-hood systems including motors powering items such as an engine cooling fan, an electro-hydraulic power steering pump or a blower motor, this locally generated RFI may be picked up by the vehicle radio or under-hood or dashboard computer controls.

SUMMARY OF THE INVENTION

The invention is a pulse width modulated DC motor operating system comprising a DC power supply with power and ground terminals, a low pass filter including charge storage means, a DC motor having an armature terminal connected through the low pass filter to the power terminal and another armature terminal, a FET having a drain connected to the other motor armature terminal, a source and a gate and a resistor connected between the FET source and the ground terminal of the DC power supply. It further comprises means for generating a PWM signal at a predetermined frequency and duty cycle and applying it to the FET gate to switch the DC motor armature current, a free-wheeling diode connected across the motor armature terminals with its anode connected to the FET drain and a capacitor connected from the source of the FET to the cathode of the diode with minimal lead length to reduce stray inductance. The capacitor is effective to communicate voltage shifts across the resistor with FET switching to the cathode of the diode and thus serve as a source of supplemental current flow through the diode during diode switching partially in preference to the charge storage means of the low pass filter, whereby the diode switching voltage spikes communicated through the low pass filter to the DC power supply are reduced in amplitude and frequency. Further details and advantages will be apparent from the accompanying drawings and following description of a preferred embodiment.

DESCRIPTION OF A PREFERRED EMBODIMENT

Figure 1:
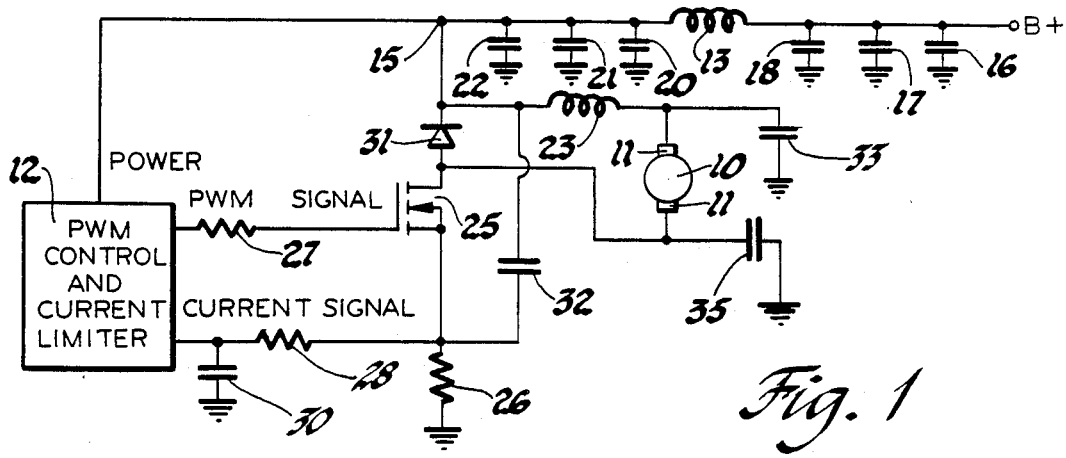
FIG. 1 is a diagram, partly in circuit form and partly in block form, of a preferred embodiment of this invention.

Referring to FIG. 1, a DC electric motor 10 has field generating apparatus, not shown, preferably of the permanent magnet type. An armature circuit of motor 10 is illustrated by brushes 11, which are understood to be part of a standard commutator apparatus. A DC power supply includes a B+ terminal and a ground terminal. This may be the common storage battery and alternator of a motor vehicle electrical system, together with appropriate voltage regulation apparatus. Motor 10 may be used in a vehicle under-hood system for an engine cooling fan, a heater or air conditioner blower motor or an electric power steering system, wherever multi-speed motor operation is required.

In order to provide multi-speed operation for motor 10, a PWM (pulse width modulation) control apparatus 12 is provided. Apparatus 12 may be any suitable chopper apparatus capable of generating a PWM voltage output signal at a specified frequency such as 20 KHz and a controllable duty cycle. It may further include current limiting circuitry responsive to an input signal indicative of motor armature current. Such apparatus is well known in the art and is thus not described in further detail here.

The B+ terminal of the DC power supply is connected to the circuit through a low pass filter which is partly effective in reducing the high frequency transients communicated back to the power supply. A 3–12 microhenry inductor 13 connects the B+ terminal to a junction 15. Three 470 microfarad electrolytic capacitors 16, 17 and 18 are connected in parallel from terminal B+ to ground; and a fourth such capacitor 20 and two 4.7 microfarad stacked film capacitors 21 and 22 are connected in parallel from junction 15 to ground. Junction 15 is connected to the power input of apparatus 12 to provide operating power therefor. Junction 15 is further connected through a ferrite bead inductor 23 to one brush 11 of the motor 10 armature circuit. The other brush 11 is connected to the drain of a FET such as power MOSFET 25, which has a source connected through a low impedance (0.01 ohm) resistor 26 to ground. This completes an armature circuit for motor 10 through MOSFET 25. Monolithic ceramic motor bypass capacitors 33 and 35 (typically 0.001 mFd) may also be provided for the reduction of RFI at CB and FM frequencies. Capacitors 33 and 35 and ferrite bead inductor 23 are mounted as closely as possible to the motor to reduce radiating lead length. A good place is on the brush holders.

MOSFET 25 has a gate connected through a resistor 27 to a PWM voltage signal output of apparatus 12 and receives thereby a PWM signal for control of the armature current of motor 10. In addition, the source of MOSFET 25 is connected through a low pass filter, comprising 10K series resistor 28 and 0.01 microfarad shunt capacitor 30, to a current level signal input of apparatus 12. Since resistor 26 carries the armature current of motor 10, this input of apparatus 12 receives a signal voltage which is proportional to average motor armature current.

A freewheeling diode 31 is connected in parallel with the armature of motor 10 with its cathode connected to junction 15 and its anode connected to the drain of MOSFET 25. This diode provides a current path for the armature current of motor 10 when MOSFET 25 is turned off, since the inductive armature winding of motor 10 does not allow the armature current to change suddenly. Such freewheeling diodes are standard devices in switched inductive circuits. However, diode 31 also has an undesirable property in that it takes a finite time to switch from its forward conducting state to its back biased non-conducting state when MOSFET 25 switches on and vice versa when MOSFET 25 switches off. During this extremely short but finite time, diode 31 is essentially a short circuit from junction 15 to the drain of MOSFET 25. For example, if MOSFET 25 switches on, diode 31 is switched from its forward conducting state to its back biased state and momentarily becomes a short circuit between junction 15 and the drain of MOSFET 25. Thus diode 31 momentarily becomes a low impedance shunt across motor 10 and would tend to draw extra current from the capacitors 22, 21, 20, 18, 17 and 16 of the low pass filter between junction 15 and terminal B+. This would create a momentary downward spike in the B+ power supply voltage with high frequency harmonics that could be radiated to neighboring electrical systems as RFI.

This invention prevents the foregoing with a capacitor 32 connected between the source of MOSFET 25 and the cathode of diode 31. Capacitor 32 differs from just another capacitor in parallel with capacitors 22, 21 and 20 in two main ways. First, it is connected to the cathode of diode 31 with a short lead having the lowest possible stray inductance. This stray inductance is significantly smaller than that between diode 31 and capacitor 22. The second difference is that it is connected to ground through resistor 26, which has a small but significant impedance and is in series with the armature of motor 10 and MOSFET 25. As FET turns on, therefore, the voltage at the ungrounded end of resistor 26, which is the voltage at the source of MOSFET 25, will jump upwards with current flow through, and thus a voltage drop across, resistor 26. This voltage drop is increased by the (L)(di/dt) voltage drop due to the increasing current through resistor 26, since a wire wound resistor has some inductance L. The voltage across capacitor 32 requires a finite time to change and, in fact, will change downward only by charge flowing in the reverse direction through diode 31. In addition, the stray inductance between the cathode of diode 31 and capacitors 22, 21, etc. provides some momentary isolation between diode 31 and the low pass filter on the power supply compared with the connection between diode 31 and capacitor 32. Therefore, just as diode 31 becomes a momentary short circuit from its cathode to MOSFET 25, capacitor 32 is placed in a condition to supply most of the current flowing through that short circuit. This current flows momentarily in preference to that from capacitors 22, 21, etc. while the diode is a short circuit and reduces the discharge of the latter capacitors and thus the voltage spike passed on to the DC power supply.

Figure 2:
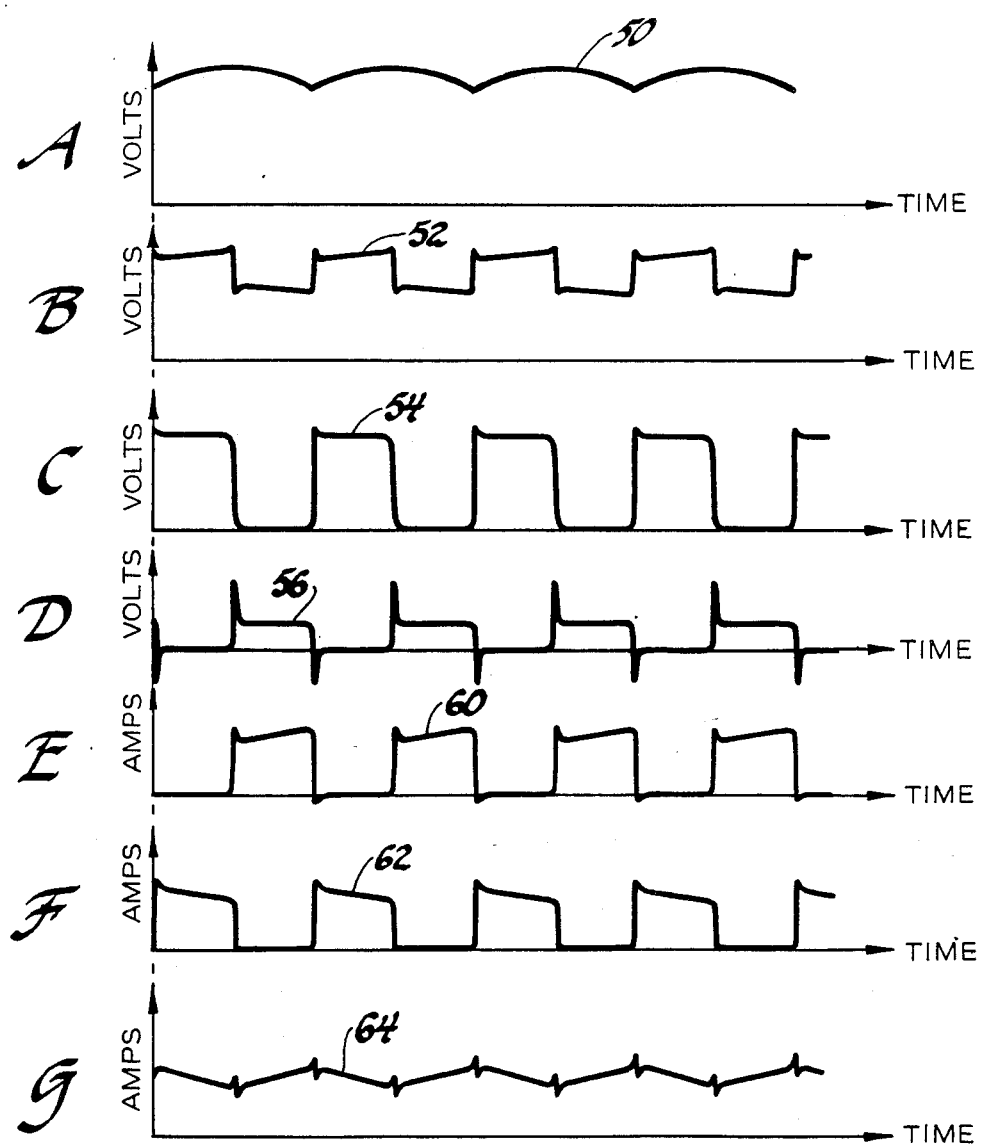
FIG. 2 shows a plurality of waveforms illustrating the operation of the circuit of FIG. 1, with FIG. 2A–2D showing voltage waveforms and FIG. 2E–2G showing current waveforms at various points in the circuit of FIG. 1.

This result may be seen in the curves of FIG. 2. Curves 50, 52, 54 and 56 of FIGS. 2A, 2B, 2C and 2D show the voltage at the B+ terminal of the power supply, junction 15, the drain of MOSFET 25 and the source of MOSFET 25, respectively. Although the curves are not drawn to completely accurate scale, they are sufficiently accurate in relative terms to show the reduction in amplitude of the turn on spikes as one proceeds from curve 56, representing the voltage at the source of MOSFET 25, to curve 52, representing the voltage at junction 15, and finally to curve 50, representing the B+ terminal of the power supply. Curves 60, 62 and 64 of FIGS. 2E, 2F and 2G represent the currents through MOSFET 25, freewheeling diode 31 and motor 10, respectively.

A similar but reverse process occurs when MOSFET 25 is switched off again. Diode 31 is switched from its back biased state to its forward conducting state to carry the motor armature current, which cannot be suddenly shut off due to the inductance of the armature winding. During this transition, the voltage at junction 15 would tend to increase due to part of the energy stored in the armature winding inductance returning to the DC power supply. However, capacitor 32 tends to take a large part of this momentary current to increase its voltage, since the voltage at the source of MOSFET 25 decreases to ground or below with decreasing current through resistor 26. This provides the recharging of capacitor 32 required for the next cycle.

In combination with resistor 26, capacitor 32 provides charge and energy storage more closely coupled to diode 31 and MOSFET 25 than the capacitors 22, 21, etc. of the low pass filter protecting the B+ terminal of the DC power supply. This combination, therefore, assists the low pass filter do its job by reducing the diode switching voltage spikes before they are applied to the low pass filter and thus reduces the amplitude and frequency of RFI created in the system. It can also be seen that resistor 26 does double duty in the circuit, being simultaneously part of the RFI reducing apparatus and part of the current limiting circuitry.

The embodiments of the invention in which an exclusive property or privilege is claimed are defined as follows:

1. A pulse width modulated DC motor operating system comprising, in combination:

a DC power supply with power and ground terminals;

a low pass filter including charge storage means;

a DC motor having an armature terminal connected through the low pass filter to the power terminal and another armature terminal;

a FET having a drain connected to the other motor armature terminal, a source and a gate, the FET having a current carrying path between source and drain switchable in response to a signal on its gate between conducting and non-conducting states;

a resistor connected between the FET source and the ground terminal of the DC power supply;

means for generating a PWM signal at a predetermined frequency and duty cycle and applying it to the FET gate to switch the DC motor armature current;

a free-wheeling diode connected across the motor armature terminals with its anode connected to the FET drain, the freewheeling diode being switched between its forward conducting and back-biased states as the FET is switched between its non-conducting and conducting states and tending to become a momentary short circuit across the motor armature terminals as it is so switched; and a capacitor connected from the source of the FET to the cathode of the diode with minimal lead length to reduce stray inductance, the capacitor being effective to communicate voltage shifts across the resistor with FET switching between its conducting and non-conducting states to the cathode of the diode and thus serve as a source of supplemental current flow through the diode during diode switching partially in preference to the charge storage means of the low pass filter, whereby the diode switching voltage spikes communicated through the low pass filter to the DC power supply are reduced in amplitude and frequency.

2. A pulse width modulated DC motor operating system according to claim 1 in which the means for generating a PWM signal at a predetermined frequency and duty cycle includes current limiting means responsive to a voltage signal and further comprising another low pass filter connected between the source of the FET and the current limiting means to provide the voltage signal by averaging the voltage drop across the resistor, whereby the resistor functions simultaneously in both the RFI limiting circuitry by means of its instantaneous voltage drop and the current limiting circuitry by means of its average voltage drop.

* * * * *